United States Patent
Frese et al.

(10) Patent No.: US 8,100,628 B2
(45) Date of Patent: Jan. 24, 2012

(54) METHOD FOR CONTROLLING A WIND ENERGY PLANT

(75) Inventors: Thomas Frese, Norderstedt (DE); Gerd Hose, Preetz (DE); Lars-Ulrich Wiese-Muller, Pinneberg (DE)

(73) Assignee: Nordex Energy GmbH, Norderstedt (DE)

( * ) Notice: Subject to any disclaimer, the term of this patent is extended or adjusted under 35 U.S.C. 154(b) by 1090 days.

(21) Appl. No.: 11/947,542

(22) Filed: Nov. 29, 2007

(65) Prior Publication Data

US 2009/0081041 A1    Mar. 26, 2009

(30) Foreign Application Priority Data

Sep. 22, 2007  (DE) .................. 10 2007 045 437

(51) Int. Cl.
   *F03D 7/04*        (2006.01)
(52) U.S. Cl. .......................... 415/4.3; 415/4.5
(58) Field of Classification Search ............... 415/1, 4.3, 415/4.5, 129; 416/155; 290/44, 55; 700/287
   See application file for complete search history.

(56) References Cited

U.S. PATENT DOCUMENTS

| | | | | |
|---|---|---|---|---|
| 4,464,929 A | * | 8/1984 | Willis | 73/146.8 |
| 4,815,936 A | * | 3/1989 | Stoltze et al. | 416/9 |
| 5,289,041 A | * | 2/1994 | Holley | 290/44 |
| 7,728,452 B2 | * | 6/2010 | Arinaga et al. | 290/44 |
| 2008/0290664 A1 | | 11/2008 | Kruger | |

FOREIGN PATENT DOCUMENTS

| | | |
|---|---|---|
| DE | 19717059 | 7/1998 |
| DE | 10058076 | 6/2002 |
| EP | 0709571 | 5/1996 |
| WO | WO 2007/099936 * | 9/2007 |

OTHER PUBLICATIONS

Windkraftanlagen, 3rd Edition, Sringer Verlag, Chapter 5, Rotor Aerodynamics, by Erich Hau, pp. 91-117.

* cited by examiner

*Primary Examiner* — Ninh H Nguyen

(74) *Attorney, Agent, or Firm* — Vidas, Arrett & Steinkraus, P.A.

(57) ABSTRACT

The present invention is related to a method for controlling a wind energy plant, with a nacelle disposed on a tower and with a rotor with at least one rotor blade, the blade adjustment angle of which can be adjusted by means of a blade adjustment equipment. The objective to provide a reduction of the loads acting on the plant when there is a malfunction of the blade adjustment equipment is resolved according to the present invention in that the function of the blade adjustment equipment is monitored, and when an error of the blade adjustment equipment occurs, the nacelle is rotated from an operating position into a rest position, in which there is a flow of the wind against the surface extended by the at least one rotor blade (4) in a rotation of the rotor which is reduced with respect to the operating position.

7 Claims, 1 Drawing Sheet

METHOD FOR CONTROLLING A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for controlling a wind energy plant, with a nacelle disposed on a tower and with a rotor with at least one rotor blade, the blade adjustment angle of which can be adjusted by means of a blade adjustment equipment, in which the nacelle is rotated around the tower axis.

Wind energy plants in which the blade adjustment angle (also called pitch angle) is adjusted, i.e. the angle of the rotor blade with respect to the rotor plane, are known since a long time. By means of a blade adjustment equipment, the blade adjustment angle can be adjusted depending on the wind velocity acting on the blade (also called pitch adjustment). Thus, at a blade adjustment angle of 90°, there is a minimum power conversion of the wind into mechanical energy, whereas at 0°, maximum power conversion takes place. Such adjustment equipments are provided with electric or hydraulic drives in many cases. In particular, an individual adjustment equipment may be provided for each rotor blade of a wind energy plant.

Plants are also known, in which when exceeding a maximum wind velocity, a stall on the blade, and by doing so a drastic reduction of the power conversion, can be created by means of a blade adjustment equipment ("active stall"). Plants described above with a pitch control and plants with an active stall control are described in Erich Hau: "Windkraftanlagen", $3^{th}$ edition, Springer Verlag, p. 89 ff, the entire contents of which is incorporated herein by reference.

Furthermore, it is known to rotate the nacelle of wind energy plants around the tower axis via an azimuth drive, in order to align the wind energy plant corresponding to the actual wind direction, and thus to optimize the yield. For this purpose, the nacelle is rotated such that it points into the wind with its rotor. In the state of the art, it is also known to avoid a damage of the plant due to excessive load when too high wind velocities occur, by performing a rotation of the nacelle abround the tower axis.

For example, in DE 197 17 059 C1, the entire contents of which is incorporated herein by reference, it is proposed for an active stall plant to adjust the blade pitch angles of the rotor blades such that the blades occupy an angle of −90° with respect to the rotor plane, and to turn the nacelle abround the tower axis about 180° to the lee side of the tower thereafter. From EP 0 709 571 A2, the entire contents of which is incorporated herein by reference, it is furthermore known to adjust the blade adjustment angles of the rotor blades such that the rotor rotates automatically around the tower axis into a load-depleted parking position. Finally, in DE 100 58 076 A1, the entire contents of which is incorporated herein by reference, it is proposed to adjust the blade adjustment angles of the rotor blades in a first wind velocity such that they stand in the flag position or generate a stall, respectively. Further, it is proposed to rotate the rotor about 180° around the tower axis towards the lee side when there is a second, higher wind velocity.

However, the known procedures are only possible when the blade adjustment equipment works without problems. When in contrary the blade adjustment equipment fails, the proposed methods can no more be executed in a reliable way. In this case, an exceeding of the maximum permitted rotational speed of the rotor can take place in a strong wind load. Such an excessive rotational speed cannot even be prevented by the rotor brake provided in wind energy plants. This is because the braking power of this brake is not dimensioned to diminish the rotor's rotational speed against strong attacking wind. There is the danger of damage of the rotor brake. In addition, at a malfunction of the blade adjustment equipment, the load by the attacking wind on the plant and on the rotor and its blades in particular is still too high in part, even at the parking position proposed in the state of the art.

Based on the explained state of the art, the present invention has the objective to indicate a method of the initially mentioned type by which a reduction of the loads acting on the plant is provided in a malfunction of the blade adjustment equipment.

BRIEF SUMMARY OF THE INVENTION

The present invention resolves the goals for the forecited method in that the function of the blade adjustment equipment is monitored, and when an error of the blade adjustment equipment occurs, the nacelle is rotated from an operating position into a rest position, in which there is a flow of the wind against the surface extended by the at least one rotor blade in a rotation of the rotor which is reduced with respect to the operating position. Thus, according to the invention, the blade adjustment equipment for adjusting the pitch angle, the pitch control for example, is monitored. When an error of the blade adjustment equipment is detected, the nacelle is automatically rotated into the rest position. An error has to be detected in the case, for instance, that a desired value of the blade adjustment deviates from a measured actual value of the blade adjustment in a critical degree. For instance, a limit difference between desired and actual value may be defined. When this limit difference is exceeded, an error is put out. When the blade adjustment equipment has furthermore a redundancy system, it may be provided that an error is put out only when a corresponding error has been recognised for the redundancy system also.

When the rotor blades of the plant are positioned in a plane, they extend a surface positioned in a plane in a rotation of the rotor, a circular surface in particular. However, when the rotor blades are not disposed in a plane, they correspondingly extend an uneven surface in a rotation of the rotor, a conical surface for example.

The nacelle is rotated into a rest position from an operating position, in which it is situated at the time of the occurrence of the error of the blade adjustment equipment. In the rest position, the virtual surface extended by the rotor blades in one rotation of the rotor is less strongly attacked by the wind than in the operating position. Thus, the aerodynamic power capture of the rotor is reduced in the rest position, by diminishing the effective rotor surface with respect to the wind direction. That is to say, the nacelle is moved off the wind. By doing so, the load of the rotor blades and with it that of the rotor and the other plant components is also reduced in the rest position. Thus, it is made sure that even in a malfunction of the blade adjustment equipment, critical rotational speeds of the rotor and with this a possible damage of the plant will not occur.

The rotor may have at least two and in particular three rotor blades. The blade adjustment equipment can comprise a control equipment for controlling the blade adjustment angle. In this, one individual blade adjustment equipment can be assigned to each blade. It may then be provided that all of these equipments are monitored. For triggering the rotation of the nacelle into the rest position, it may then be sufficient that the adjustment equipment has an error for at least one blade.

The nacelle can be allowed to remain in the rest position as long as the error of the blade adjustment equipment lasts. It may be provided that the rotation of the nacelle does not take place when an azimuth drive possibly used for the rotation is erroneous, is in the manual operation or is stopped for other reasons, when there is a manual stop, for instance. In addition, the rotation of the nacelle into the rest position can be prevented when the wind velocity, its arithmetic mean for instance, falls below a value necessary for the rotation of the nacelle (the yawing).

Even though the blade adjustment equipment is designated by example as a pitch control in the present context, in principle it may also be dealt with an active stall blade adjustment equipment, of course.

Possible damages of plant components through the wind when there is an error of the blade adjustment equipment are avoided in a particularly safe way, when the flow of the wind against the surface extended by the at least one rotor blade in a rotation of the rotor is minimum in the rest position. In particular, the nacelle is moved away from the wind in this realisation such that the rotational axis of the rotor has an angle with respect to the wind direction of 90°. Thus, the aerodynamic power capture of the rotor is minimized by minimizing the effective rotor surface with respect to the wind direction.

According to a further embodiment of the present invention, the nacelle can be rotated around the tower axis from its operating position about 90° in order to rotate it into the rest position. Thus, in this embodiment, the nacelle is in a position in which the surface extended by the rotor blades in a rotation of the rotor gets maximum flow of the wind against it. Thus, in this operating position normally taken on, the wind stands vertical on the rotor plane, provided that the rotational axis of the rotor is horizontal. The rotational axis of the rotor (or the longitudinal direction of the nacelle, respectively) is then parallel to the wind direction. In contrary, in the rest position turned about 90°, a horizontal rotational axis of the rotor is vertical to the wind direction. The so-called yawing angle is 90° in this case. In this position rotated about 90° around the tower axis, the flow of the wind against the surface extended by the rotor blades in a rotation around the rotor axis is minimum. Thus, in this embodiment, the nacelle is turned away from the wind in the shortest way. The occurring loads are kept as small as possible by doing so.

A further embodiment provides that the nacelle is rotated into the rest position only when the blade adjustment angle of at least one rotor blade is also smaller than a preset limit value of the blade adjustment angle. Thus, in this embodiment a further condition has to be fulfilled for the rotation into the rest position, besides to a malfunction of the blade adjustment equipment, namely that at least one rotor blade falls below a limit value of the blade adjustment angle. The power capture by the rotor blade is maximum at a blade adjustment angle or pitch angle, respectively, of 0°, and minimum at a blade pitch of 90°. As a consequence, according to this embodiment, a rotation into the rest position upon a malfunction of the blade adjustment equipment is performed only when there is a critical load through the wind, a relevant one in particular, due to the existing pitch angle. With several rotor blades, it is sufficient in this when the pitch angle is smaller than the limit value of the pitch angle for one of the rotor blades. A particularly practical embodiment provides that the limit value of the blade adjustment or pitch angle, respectively, is 60°.

The nacelle can be rotated into the rest position by an azimuth drive of the wind energy plant, i e. by motor action, in a particularly simple and reliable manner. In this it may be provided that the nacelle is only rotated into the rest position when the azimuth drive is in the production operation. In particular, an automatic rotation of the nacelle into the rest position is not possible in the service mode of the azimuth drive.

A further, particularly preferred embodiment provides that in particular, the nacelle in the rest position is made to follow up continuously in a change of the wind direction, so that a flow of the wind against the surface extended by the at least one rotor blade in a rotation of the rotor is reduced, and preferably minimum with respect to the operating position again. Thus, in this embodiment the nacelle is also rotated in a corresponding manner in a change of the wind direction, so that the rotor surface effective for the wind is reduced or minimum, respectively, again. Thus, it is made certain that there is no danger for the safety of the plant even at a wind change during the existence of the pitch error. Suitable wind measuring devices may be provided for measuring the wind direction. The follow-up can be interrupted when the azimuth drive used for the follow-up is stopped for instance, is erroneous for instance, when there is a manual stop of such an azimuth drive, the same is not switched into the production operation but into the service mode for instance, or the wind velocity falls below a value required for rotating the nacelle.

According to an embodiment particularly suited for practice, the follow-up in a change of the wind direction can be performed by an azimuth drive of the wind energy plant, thus in a motor-driven way.

BRIEF DESCRIPTION OF THE SEVERAL VIEWS OF THE DRAWINGS

One example of the realisation of the present invention is explained in more detail by means of a drawing in the following. Schematically show.

DETAILED DESCRIPTION OF THE INVENTION

Figure 1:
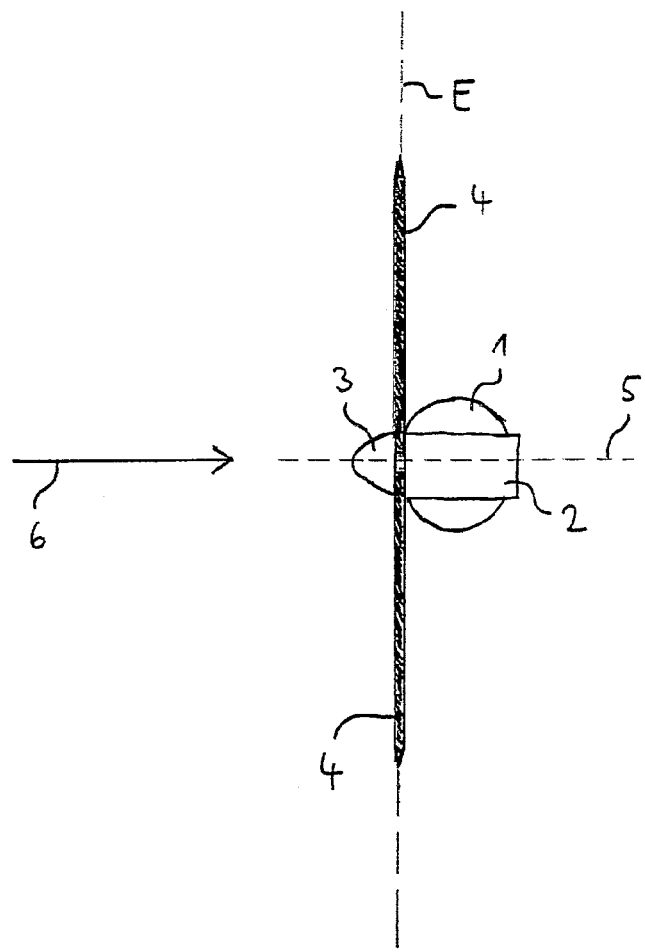
FIG. 1 a wind energy plant in its operation position, in a top view.

While this invention may be embodied in many different forms, there are described in detail herein a specific preferred embodiment of the invention. This description is an exemplification of the principles of the invention and is not intended to limit the invention to the particular embodiment illustrated In the figures, the same reference signs designate the same objects. In the figures, a wind energy plant with a nacelle 2 arranged on a tower 1 is depicted. In the nacelle 2, a rotor 3 with three rotor blades 4 is installed, which are depicted only very schematically in the shown example. The blade adjustment angle of the rotor blades 4 can be adjusted and controlled by a blade adjustment equipment (pitch control) which is not shown in more detail. In this, an own blade adjustment equipment is assigned to each rotor blade 4.

In the depicted example, the rotor blades 4 are substantially arranged in a plane E. In their rotation around the rotor axis, they extend a circular surface, which is also essentially situated in the plane E. The rotational axis of the rotor 3 is designated with the reference sign 5 in the figures. By means of an azimuth drive not shown in more detail, the nacelle 2 can be rotated around the tower axis. The direction of the wind hitting the wind energy plant is illustrated schematically by the arrow 6 in the figures.

In FIG. 1, the wind energy plant is shown in its operating position. In this position, the surface extended by the rotation of the rotor blades 4 is vertical to the wind direction 6. The rotational axis 5 of the rotor 3, which is parallel to the longitudinal axis of the nacelle 2, is parallel to the wind direction 6 in this position. In this operating position, the rotor surface effective with respect to the wind direction 6 is maximized. Thus, the aerodynamic power capture is maximum in this position. Depending on the strength of the attacking wind, the adjustment angles of the rotor blades 4 are adjusted by means of the blade adjustment equipment.

In the operation of the plant, the blade adjustment equipment and the blade pitch in particular are continuously monitored. If a difference between the desired blade adjustment angle and the measured actual blade adjustment angle exceeds a preset limit value for at least one of the rotor blades 4, and if the same is also the case for a redundancy blade adjustment equipment optionally provided for the rotor blades 4, an error of the blade adjustment equipment is put out. If furthermore one of the blade adjustment angles (pitch angles) of at least one rotor blade is smaller than a limit value of the blade adjustment angle of 60°, the rotation of the nacelle 2 into a rest position is caused. As the case may be, other conditions can be preset which have to be fulfilled in order to let the rotation into the rest position occur. A further condition is, for instance, that the wind velocity has not fallen below a value necessary for rotating the nacelle 2. In the depicted example, the rotation of the nacelle 2 into the rest position takes place motor-driven, by means of the azimuth drive of the wind energy plant.

Figure 2:
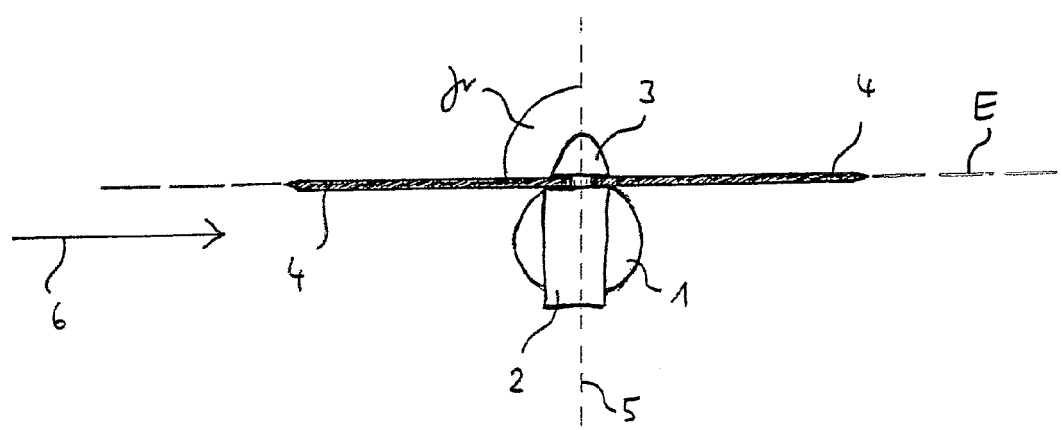
FIG. 2 the wind energy plant from FIG. 1 in its rest position, in a top view.

The rest position of the nacelle 2 is depicted in FIG. 2. It can be recognised that the nacelle 2 has been rotated about an angle γ of 90° around the tower axis, in order to turn it into the rest position from the operating position shown in FIG. 1. In this rest position, the rotational axis 5 of the rotor is vertical to the wind direction 6. The surface extended by the rotor blades 4 in a rotation of the rotor is parallel to the wind direction 6. Whilst in the operating position, a maximum flow of the wind against the surface extended by a rotation of the rotor blades 4 around the rotor axis takes place, the flow against the surface extended by the rotor blades 4 in a rotor rotation is minimum in the rest position shown in FIG. 2. In this rest position, the aerodynamic power capture of the rotor 3 is minimised by minimizing the rotor surface effective for the wind. Thus, in this position it is made sure that even at defective blade adjustment equipment, excessive rotational numbers possibly damaging the plant or other excessive loads do not occur. The nacelle 2 remains in this rest position as long as the error of the blade adjustment equipment lasts.

In the depicted example, the nacelle 2 is made to follow up in a change of the wind direction 6 by means of the azimuth drive, such that a minimum flow against the surface extended by the rotation of the rotor blades 4 around the rotor axis takes place again. In the depicted example, wind measurement devices are provided, which measure the wind direction. When a change of the wind direction 6 is detected, the nacelle 2 of the wind energy plant is made to follow up corresponding to the wind. Thus, it is made sure that an effective reduction of the loads acting on the plant is granted in a change of the wind direction 6.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for controlling a wind energy plant, with a nacelle disposed on a tower and with a rotor with at least one rotor blade, the blade adjustment angle of which can be adjusted by means of a blade adjustment equipment, in which the nacelle is rotated around the tower axis, characterised in that the function of the blade adjustment equipment is monitored, and when an error of the blade adjustment equipment occurs, the nacelle (2) is rotated from an operating position into a rest position, in which there is a flow of the wind against the surface extended by the at least one rotor blade (4) in a rotation of the rotor which is reduced with respect to the operating position, characterised in that the nacelle (2) is rotated into the rest position only when in addition, the blade adjustment angle of at least one rotor blade (4) is smaller than a preset limit value of the blade adjustment angle.

2. A method according to claim 1, characterised in that in the rest position, there is minimum flow of the wind against the surface extended by the at least one rotor blade (4) in a rotation of the rotor.

3. A method according to claim 2, characterised in that the nacelle (2) is rotated about 90° around the tower axis from its operating position, in order to rotate it into the rest position.

4. A method according to claim 1, characterised in that the limit value of the blade adjustment angle is 60°.

5. A method according to claim 1, characterised in that the nacelle (2) is rotated into the rest position by an azimuth drive of the wind energy plant.

6. A method according to claim 1, characterised in that the nacelle (2) in the rest position is made to follow-up in a change of the wind direction (6), such that there is a flow of the wind against the surface extended by the at least one rotor blade (4) in a rotation of the rotor which is reduced with respect to the operating position again.

7. A method according to claim 6, characterised in that the follow-up takes place by an azimuth drive of the wind energy plant.

* * * * *